(12) United States Patent
Ballard et al.

(10) Patent No.: US 11,740,919 B2
(45) Date of Patent: Aug. 29, 2023

(54) SYSTEM AND METHOD FOR HARDWARE OFFLOADING OF NESTED VIRTUAL SWITCHES

(71) Applicant: DELL PRODUCTS, LP, Round Rock, TX (US)

(72) Inventors: Lee Ballard, Georgetown, TX (US); Andy Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 482 days.

(21) Appl. No.: 16/876,703

(22) Filed: May 18, 2020

(65) Prior Publication Data
US 2021/0357242 A1    Nov. 18, 2021

(51) Int. Cl.
*H04L 45/00* (2022.01)
*H04L 49/00* (2022.01)
*G06F 9/455* (2018.01)

(52) U.S. Cl.
CPC .......... *G06F 9/45558* (2013.01); *H04L 45/38* (2013.01); *H04L 49/70* (2013.01);
(Continued)

(58) Field of Classification Search
None
See application file for complete search history.

(56) References Cited

U.S. PATENT DOCUMENTS

| | | | |
|---|---|---|---|
| 8,995,272 B2 * | 3/2015 | Agarwal ................. | H04L 47/10 370/230 |
| 9,130,867 B2 * | 9/2015 | Karino .................... | H04L 45/38 |

(Continued)

FOREIGN PATENT DOCUMENTS

| | | | | |
|---|---|---|---|---|
| WO | WO-2013026050 A4 * | 5/2013 | ............. | H04L 12/66 |
| WO | WO-2015121750 A1 * | 8/2015 | ......... | G06F 9/45558 |
| WO | WO-2021041440 A1 * | 3/2021 | ............. | G06F 9/455 |

OTHER PUBLICATIONS

Netronome, 'OVS Offload Models Used with NICs and SmartNICs_Pros and Cons', May 2018. Retrieved online on Aug. 24, 2022 from https://www.netronome.com/blog/ovs-offload-models-used-nics-and-smartnics-pros-and-cons/ (Year: 2018).*

(Continued)

*Primary Examiner* — Imad Hussain
*Assistant Examiner* — Sandarva Khanal
(74) *Attorney, Agent, or Firm* — Larson Newman, LLP

(57) ABSTRACT

An information handling system includes a processor and NIC coupled to the processor via a communication interface. The NIC includes a network port. The processor instantiates a virtual network including at least two virtual switches and a virtual machine. The NIC receives a first flow from a first virtual switch, the first flow directing data packets received on the network port and destined for the virtual machine to a second virtual switch, and receives a second flow from the second virtual switch, the second flow directing the data packets to the virtual machine. The NIC further receives a data packet on the network port, determines that the data packet is destined for the virtual machine, and routes the data packet to a virtual function associated with the virtual machine based on the first and second flows, without first routing the first data packet to either of the virtual switches.

18 Claims, 8 Drawing Sheets

(52) U.S. Cl.
CPC ............... *G06F 2009/4557* (2013.01); *G06F 2009/45595* (2013.01)

(56) References Cited

U.S. PATENT DOCUMENTS

| | | | |
|---|---|---|---|
| 9,565,104 B2* | 2/2017 | Zhang | H04L 49/253 |
| 9,912,774 B2 | 3/2018 | Daly et al. | |
| 10,009,270 B1* | 6/2018 | Stark | H04L 45/745 |
| 10,142,160 B1* | 11/2018 | Adams | H04L 45/66 |
| 10,382,331 B1 | 8/2019 | Sivaramakrishnan | |
| 10,572,291 B2* | 2/2020 | Cui | H04L 41/40 |
| 11,042,392 B2* | 6/2021 | Chandrappa | G06F 9/5016 |
| 2009/0300209 A1* | 12/2009 | Elzur | H04L 47/12 |
| | | | 709/242 |
| 2012/0250682 A1* | 10/2012 | Vincent | G06F 9/45558 |
| | | | 370/392 |
| 2013/0254766 A1* | 9/2013 | Zuo | H04L 49/70 |
| | | | 718/1 |
| 2015/0172102 A1* | 6/2015 | DeCusatis | H04L 43/0876 |
| | | | 370/218 |
| 2016/0232019 A1* | 8/2016 | Shah | G06F 9/45558 |
| 2017/0331725 A1* | 11/2017 | Rosenberry | H04L 45/38 |
| 2018/0109471 A1* | 4/2018 | Chang | H04L 49/70 |
| 2018/0109606 A1* | 4/2018 | Alpert | H04L 12/4641 |
| 2018/0262599 A1* | 9/2018 | Firestone | H04L 49/70 |
| 2020/0059485 A1* | 2/2020 | Ergin | H04L 63/1425 |
| 2021/0314232 A1* | 10/2021 | Nainar | H04L 41/0893 |

OTHER PUBLICATIONS

Emmerich et al., "Throughput and Latency of Virtual Switching with Open vSwitch: A Quantitative Analysis", Springer, Jul. 21, 2017. (Year: 2017).*

Kim et al.; "A Multiple Flow Tables Construction Scheme for Service Function Chaining in NFV"; 2015 IEEE; ICTC 2015; p. 113-115; Retrieved online on Apr. 4, 2023 from https://ieeexplore.ieee.org/stamp/stamp.jsp?arnumber=7354506&tag=1. (Year: 2015).*

* cited by examiner

SYSTEM AND METHOD FOR HARDWARE OFFLOADING OF NESTED VIRTUAL SWITCHES

FIELD OF THE DISCLOSURE

This disclosure generally relates to information handling systems, and more particularly relates to hardware offloading of nested virtual switches in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor and a network interface card (NIC) coupled to the processor via a communication interface. The NIC may include a network communication port coupled to a network. The processor may instantiate a virtual network including at least two virtual switches and a virtual machine. The NIC may receive a first flow from a first virtual switch, the first flow directing data packets received on the network communication port and destined for the virtual machine to a second virtual switch, and receive a second flow from the second virtual switch, the second flow directing the data packets to the virtual machine. The NIC may further receive a data packet on the network communication port, determine that the data packet is destined for the virtual machine, and route the data packet to a virtual function associated with the virtual machine based on the first and second flows, without first routing the first data packet to either of the first or second virtual switches.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
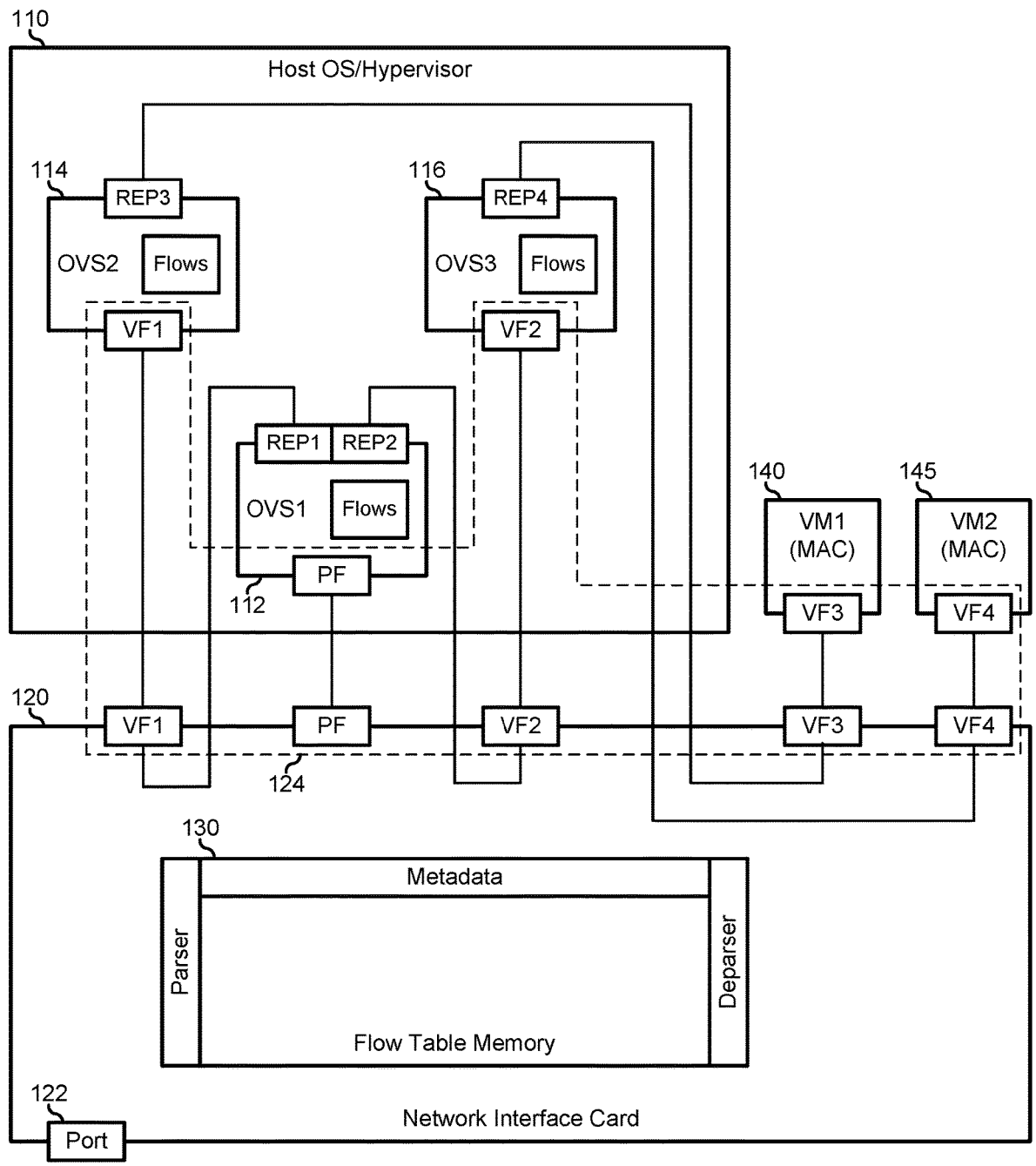
FIGS. 1-7 are block diagrams illustrating an information handling system according to an embodiment of the present disclosure.

FIG. 1 illustrates an information handling system 100 including a host operating system (OS)/virtual machine hypervisor 110, hereinafter referred to as OS 110, a network interface card (NIC) 120, and virtual machines (VMs) 140 and 145. OS 110 represents a highly virtualized operating environment instantiated on information handling system 100 that operates to instantiate VMs 140 and 145 on information handling system 100 to perform various processing functions as needed or desired. In addition to instantiating workloads in VMs 140 and 145, OS 110 instantiates virtual switches 112, 114, and 116. Virtual switches 112, 114, and 116 represent a software enabled implementation of virtual multilayered network switching scheme that is highly flexible to satisfy the changing demands of virtualized datacenters, enabling the creation of a virtual network overlay on the physical network resources of the data centers. In particular, the virtual network is a Software Defined Network (SDN), and virtual switches 112, 114, and 116 enable network automation via various program extensions, while maintaining compatibility with standard network management interfaces and protocols. In a particular embodiment, virtual switches 112, 114, and 116 are implemented utilizing an Open vSwitch implementation, a VMware vNetwork implementation, a Cisco Nexus 1000V implementation, or another commercial or proprietary implementation, as needed or desired.

Virtual switch 112 represents a central switching element of the virtual network that provides a generalized routing and switching functions for VMs 140 and 145, and may be referred to as an integration switch for the virtual network. In particular, virtual switch 112 may perform layer 2 forwarding. As such, virtual switch 112 includes a single physical function (PF) that represents a virtual port for the communication of data between OS 110 and NIC 120, and two representors (REP1 and REP2) that each represent a virtual port for the communication of data between the virtual switch and respective virtual switches 114 and 116. Here, virtual switches 114 and 116 represent distributed switching elements of the virtual network that each provide specialized routing and switching functions for respective VMs 140 and 145. In particular, virtual switches 114 and 116 may perform layer 2/layer 3 routing. For example, virtual switches 114 and 116 may represent firewalls for respective VMs 140 and 145. As such virtual switches 114 and 116 each include respective virtual functions (VF1 and VF2) that represent virtual ports associated with their respective representors (REP1 and REP2) of virtual switch 112. That is, each virtual function (VF1 and VF2) is logically connected via a virtual Ethernet cable ($V_{ETH}$) to its associated representor (REP1 and REP2). Virtual switches 114 and 116 each include respective representors (REP3 and REP4) that represent virtual ports for the communication of data between the respective virtual switch and associated VMs 140 and 145. Finally each of VMs 140 and 145 each include respective virtual functions (VF3 and VF4) that represent virtual ports associated with their respective representors (REP3) of virtual switch 114 and (REP4) of virtual switch 116. That is, each virtual function (VF3 and VF3) is logically connected via a $V_{ETH}$ to its associated representor (REP3 and REP4). Each of VMs 140 and 145 is identified on the virtual network by an associated Media Access Control (MAC) address. Here, it will be understood that virtual switches 112, 114, and 116 each include flow tables with flow table entries such as matches and actions. As such, virtual switch 112 may be understood to perform simple L2 switching with matches and actions being based upon the destination MAC address of the received data packet. Further, virtual switches 114 and 116 may be understood to be firewalls with matches and actions being based upon the destination MAC address, the destination TCP port, and the destination IP address of the received data packet. Here, if a data packet is destined for an existing TCP connection and it is a valid TCP packet for that connection the virtual switch will forward the data packet to the destination VM. Otherwise the virtual switch will drop the data packet.

NIC 120 represents a network interface device that supports programmable match-action flow offloads, such as forward, drop, modify, tunnel, encap/decap, Network Address Translation (NAT), and the like. An example of NIC 120 may include a commercially available Ethernet network interface card (NIC), a smartNIC, an Infiniband Host Channel Adapter (HCA) that supports Ethernet, a Converged Network Adapter (CNA), or the like. NIC 120 includes one or more network port 122, a physical interface 124, and a flow table memory 130. Operating in its capacity as a part of the physical network of a datacenter, NIC 120 communicates information with a connected network via a first physical communication protocol on port 122 and to communicate the information with OS 110 via a second physical communication protocol on physical communication interface 124. In this regard, NIC 120 operates to translate information between the first and second communication protocols. Port 122 may typically represent an Ethernet port, and communication interface 124 may typically represent a Peripheral Component Interface-Express (PCIe) interface, but other common network communication protocols and physical communication interfaces may be employed, as needed or desired.

In addition to its physical network operation, NIC 120 operates to handle virtual network flows within information handling system 100 and with the connected network. In particular, NIC 120 operates to handle the physical function (PF) and the virtual connections (REP1/VF1, REP2/VF2, REP3/VF3, and REP4/VF4) of virtual switches 112, 114, and 116 and VMs 140 and 145. Here, it will be understood that each network transaction on one of the physical function (PF) and the virtual functions (VF1, VF2, VF3, and VF4) will be physically transacted on communication interface 124 between OS 110 and NIC 120. Thus a data packet received on port 122, and addressed to VM 140 will be sent over communication interface 124 a first time to the physical function (PF) which will determine that the destination is VM 140, and so will forward the data packet to the representor (REP1) associated with the VM. The representor (REP1) of virtual switch 112 will issue a second transaction over communication interface 124 to the virtual function (VF1) via NIC 120, which will route the data packet by a third transaction over communication interface 124 to virtual switch 114. The representor (REP3) of virtual switch 114 will issue a fourth transaction over communication interface 124 to the virtual function (VF3) via NIC 120, which will route the data packet by a fifth transaction over the communication interface to VM 140.

Thus, while network virtualization may improve the flexibility of information handling system 100, this flexibility comes at a cost to the resources of information handling system 100. In particular, each transaction over communication interface 124 represents a separate Direct Memory Access (DMA) operation on information handling system 100. Further, it has been understood that a typical virtual switch in an information handling system may utilize the processing capabilities of three or more CPU cores to provide 10 Gb of network throughput, and near future network bandwidth requirements will see demands for 25, 50, or even 100 Gb of network throughput. Thus the ability to scale virtual network topologies is severely limited by increasing processing needs of the virtual network.

Note that as used herein, a data packet that is addressed to a VM may be determined to be so addressed based upon the functionality of the virtual switches. For example, if a virtual switch is functioning as a L2 switch, data packets will be forwarded based upon a destination MAC address and/or VLAN. On the other hand, if a virtual switch is functioning as a router, data packets will be routed based upon a destination IP address and source MAC address. As such, a typical VM pipeline may have a first virtual switch to perform encap/decap or load balancing, a second virtual switch to perform MAC/VLAN switching, and a third virtual switch functioning as a firewall.

NIC 120 further offloads the flows associated with virtual switches 112, 114, and 116. Here, it can be recognized that the connections between virtual switches 112 and 114 (REP1 to VF1), and between virtual switches 112 and 116 (REP2 to VF2) can be treated differently than the connections between virtual switch 114 and VM 140 (REP3 to VF3), and between virtual switch 116 and VM 145 (REP4 to VF4). In particular, OS 110 operates to identify the switch-to-switch connections as such, and to identify the switch-to-virtual-machine connections. In this way, NIC 120 operates to receive flow rules from virtual switches 112, 114, and 116, to store the flow rules in flow table memory 130, and, moreover, to create fast paths for switch-to-switch flows within the NIC that bypass many transactions over communication interface 124 between the NIC and OS 110.

It will be understood that before virtual switches 112, 114, and 116 are created, the PF, VFs, and REPs will have been created. That is, there will be device driver instances for each of the PF, VFs, and REPs that will appear as Ethernet interfaces to the OS (eth0, eth1, eth2, etc.). Here, when virtual switches 112, 114, and 114 are created, the associated PF, VFs, and REPs are ascribed to the virtual switches. Thus NIC 120 creates the connections (REP1/VF1, REP2/VF2, REP3/VF3, and REP4/VF4), but the user provisions the ends of these logical connectors into the virtual switches. Thus it will be understood that prior art OVS offload will offload the flow, Port→PF→REP→VF to the flow Port→VF. However, it will be similarly understood that the flow, Port→PF→REP1→VF1→REP2→VF2 will only be offloaded by prior art OVS to the flow Port→VF1→REP2→VF2. In contrast, the current embodiments offload the flow Port→PF→REP1→VF1→REP2→VF2 to the flow Port→VF2. Thus, the current embodiments permit the offloading and linking of multiple network flows. In particular, two or more interconnected virtual switches may be offloaded, as needed or desired.

Figure 2:
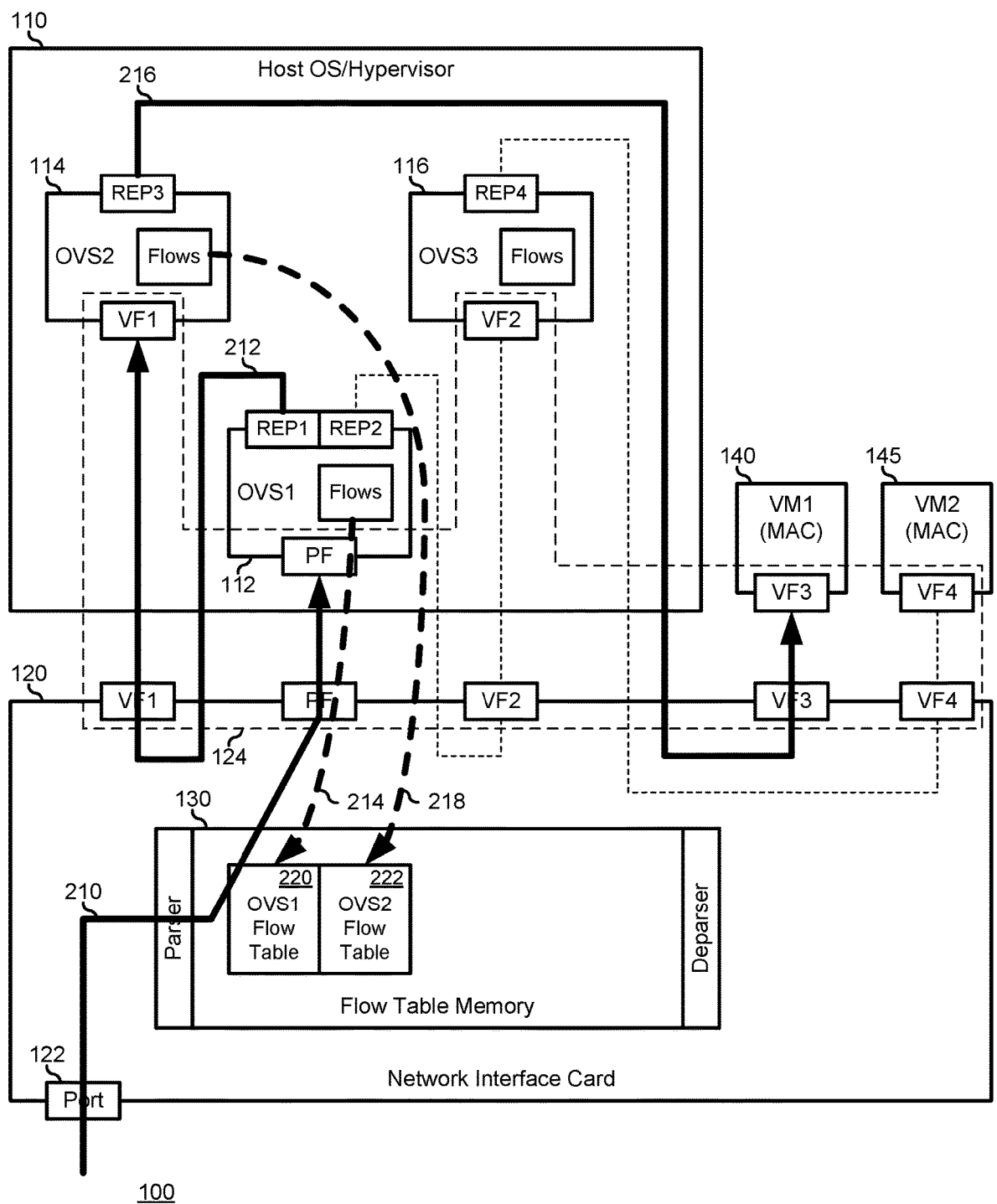
Figure 3:
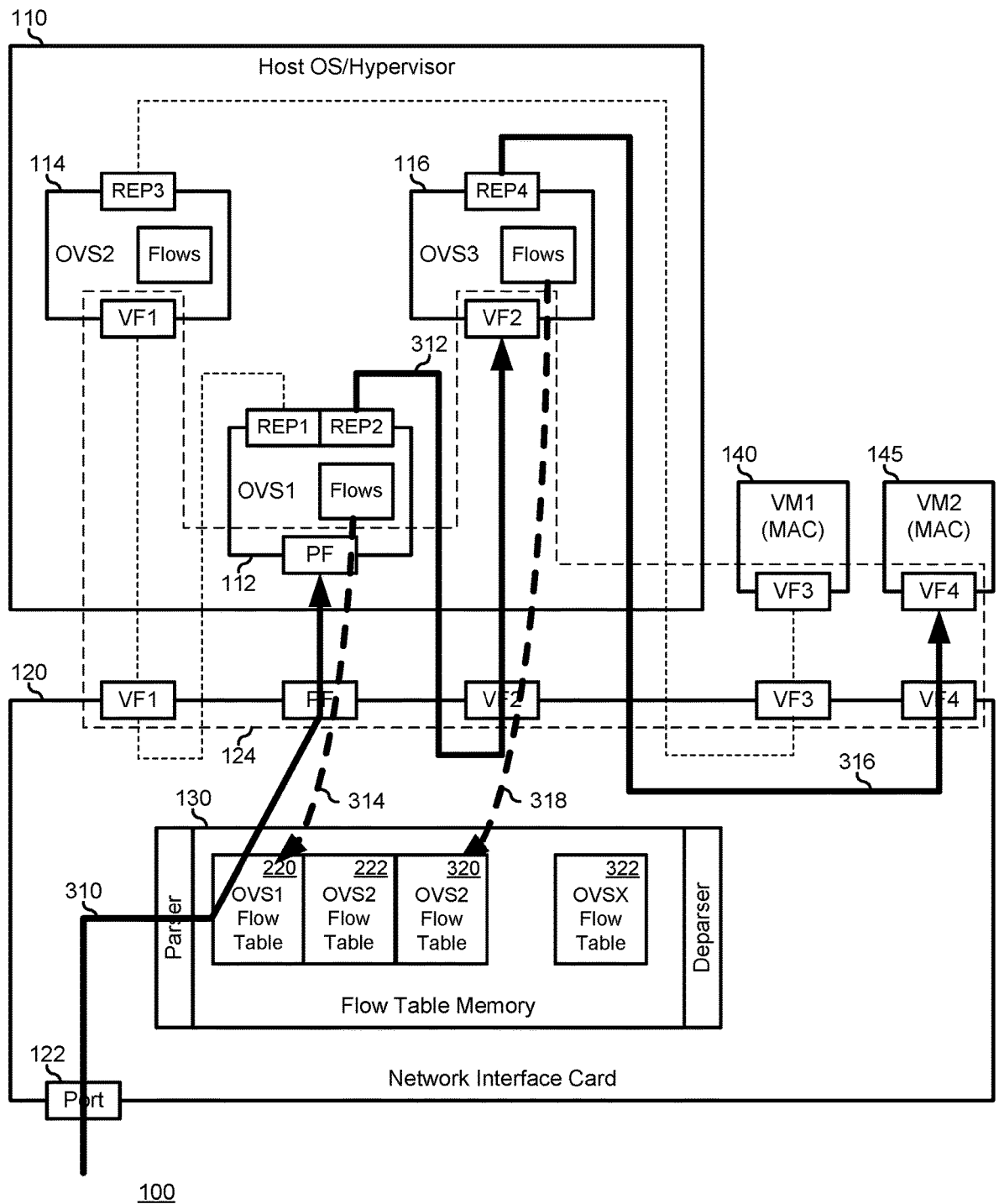
Figure 4:
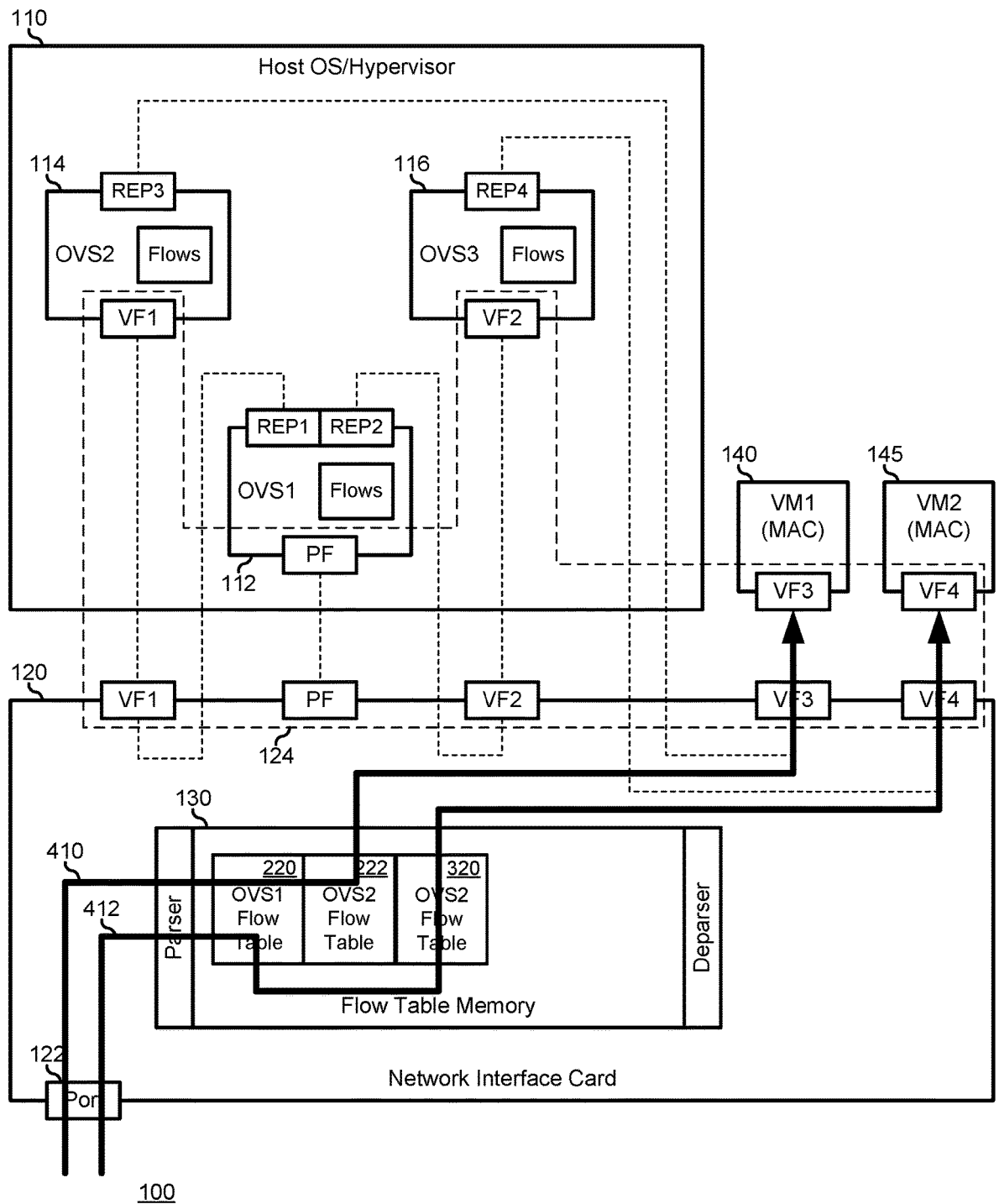

FIGS. 2-4 show the creation and use of the fast paths in NIC 120. In FIG. 2, a data packet 210 destined for an address associated with VM 140 is received at port 122, and is parsed by NIC 120. As NIC 120 has no flow routing rules for data packet 210, the NIC deparses the data packet and forwards it to PF via communication interface 124. Here, it will be understood that NIC 120 is configured to forward data packets with unknown destinations to PF, rather than being configured to drop unknown data packets. When virtual switch 112 receives data packet 210, the virtual switch determines from its flow table that the data packet is destined for the address associated with VM 140 via REP1. Then, based upon the flow table, virtual switch 112 forwards the data packet 212 to REP1, and provides the flow table entries 214 for routing data packets destined to the address associated with VM 140 to NIC 120. NIC 120 creates a flow table 220 associated with virtual switch 112 in flow table memory 130, and populates the flow table with an entry for the address associated with VM 140 to be forwarded to REP1. Data packet 212, being from REP1, is understood by NIC 120 as being connected by a virtual Ethernet cable ($V_{ETH}$) to VF1, and so NIC 120 forwards the data packet to VF1. Hence data packet 212 traverses communication interface twice. When virtual switch 114 receives data packet 212, the virtual switch determines from its flow table that the data packet is destined for the address associated with VM 140 via REP3. Then, based upon the flow table, virtual switch 114 forwards the data packet 216 to REP3, and provides the flow table entries 218 for routing data packets destined to VM 140 to NIC 120. NIC 120 creates a flow table 222 associated with virtual switch 114 in flow table memory 130, and populates the flow table with an entry for the address associated with VM 140 to be forwarded to REP3. Data packet 216, being from REP3, is understood by NIC 120 as being connected by a $V_{ETH}$ to VF3, and so NIC 120 forwards the data packet to VF3. Hence data packet 216 traverses communication interface 124 twice, and the data packet, on its route from port 122 to VM 140 traverses the communication interface five (5) times. Finally, NIC 120 creates a fast path between flow table 220 and flow table 222 for flows associated with the address associated with VM 140, thereby permitting future data packets destined for addresses associated with VM 140 to flow directly from port 122 of VF3 (Port→VF3).

In FIG. 3, a data packet 310 destined for an address associated with VM 145 is received at port 122, and is parsed by NIC 120. As NIC 120 has no flow routing rules for data packet 310, the NIC deparses the data packet and forwards it to PF via communication interface 124. When virtual switch 112 receives data packet 310, the virtual switch determines from its flow table that the data packet is destined for the address associated with VM 145 via REP2. Then, based upon the flow table, virtual switch 112 forwards the data packet 312 to REP2, and provides the flow table entries 314 for routing data packets destined to the address associated with VM 145 to NIC 120. NIC 120 populates flow table 220 with an entry for the address associated with VM 145 to be forwarded to REP2. Data packet 312, being from REP2, is understood by NIC 120 as being connected by a $V_{ETH}$ to VF2, and so NIC 120 forwards the data packet to VF2. Hence data packet 312 traverses communication interface 124 twice. When virtual switch 116 receives data packet 312, the virtual switch determines from its flow table that the data packet is destined for the address associated with VM 145 via REP4. Then, based upon the flow table, virtual switch 116 forwards the data packet 316 to REP4, and provides the flow table entries 318 for routing data packets destined to VM 145 to NIC 120. NIC 120 creates a flow table 320 associated with virtual switch 116 in flow table memory 130, and populates the flow table with an entry for the address associated with VM 145 to be forwarded to REP4. Data packet 316, being from REP4, is understood by NIC 120 as being connected by a $V_{ETH}$ to VF4, and so NIC 120 forwards the data packet to VF4. Hence data packet 316 traverses communication interface 124 twice, and the data packet, on its route from port 122 to VM 145 traverses the communication interface five (5) times. Finally, NIC 120 creates a fast path between flow table 220 and flow table 320 for flows associated with the address associated with VM 145, thereby permitting future data packets destined for addresses associated with VM 145 to flow directly from port 122 of VF4 (Port→VF4).

In FIG. 4, a first data packet 410 destined for an address associated with VM 140 is received at port 122, and is parsed by NIC 120. The data packet is identified in flow table 220 as being destined for REP1/VF1, and is then identified in flow table 222 as being destined for REP3/VF3. NIC 120 then deparses data packet 410 and forwards the data packet to VM 140 via VF3. A second data packet 412 destined for an address associated with VM 145 is received at port 122, and is parsed by NIC 120. The data packet is identified in flow table 220 as being destined for REP2/VF2, and is then identified in flow table 222 as being destined for REP4/VF4. NIC 120 then deparses data packet 412 and forwards the data packet to VM 145 via VF4. Note that neither of data packets 410 or 412 traverse communication interface 124 more than one time. Further, no processor resources of information handling system 100 are consumed in the flow control portion for the virtual network. It will be further noted that the paths shown in FIGS. 2 and 3 may result in data packets that traverse communication interface 124 more times than may be necessary in a conventional information handling system that utilizes a conventional NIC, and further result in a greater utilization the processor resources of the conventional information handling system. However, such increases in the utilization of the resources of information handling system 100 will be more than offset by the overall reduction in the utilization of the resources once the flow tables are populated.

In a particular embodiment, flow tables 220, 222, and 320 are pre-populated by respective virtual switches 112, 114, and 116, or by a SDN controller that manages the virtual switches. In this way, the learning processes as shown in FIGS. 2 and 3 are eliminated, and the data flows to VMs 140 and 145 are handled directly as shown in FIG. 4. However, it will be understood that other factors may result in periodic relearning of network flows. Such factors may include flow timeouts, MAC learning, stateful firewall learning, or the like, in virtual switches 112, 114, and 116.

Figure 5:
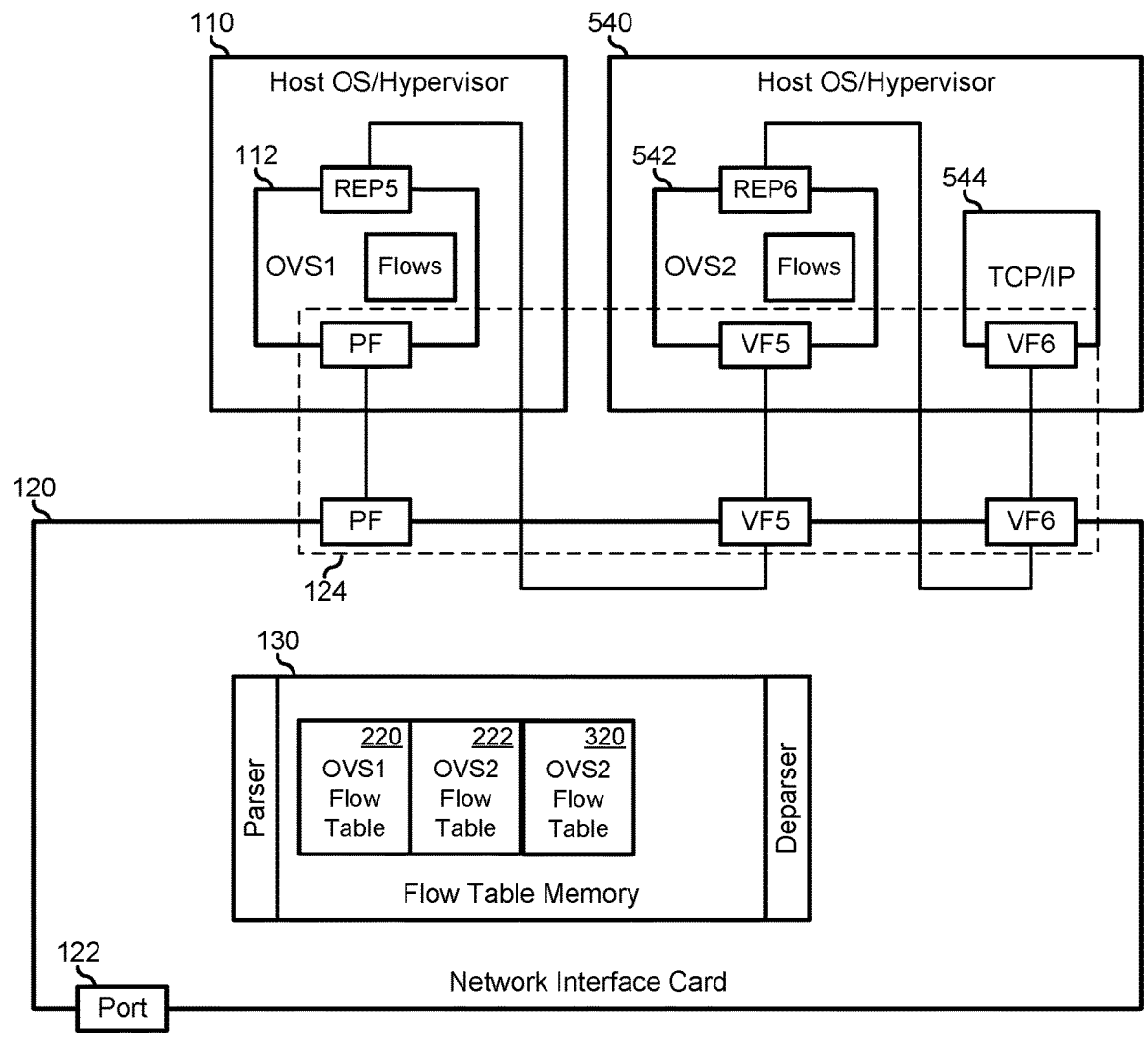

FIG. 5 illustrates information handling system 100, where a new VM 540 has been added. Here, virtual switch 112 provides the central switching element of the virtual network, providing generalized routing and switching functions for VM 540. Virtual switch 112 instantiates a new representor (REP5) that represent a virtual port for the communication of data between the virtual switch and VM 540. Here, VM 540 is instantiated with a virtual switch 542 and a network endpoint 544. Virtual switch 542 represents a distributed switching element of the virtual network that provides specialized routing and switching functions for VM 540. In particular, virtual switch 542 may perform layer 2/layer 3 routing. For example, virtual switch 542 may represent a firewall for VM 540. As such virtual switch 542 includes a virtual function (VF5) that represents a virtual port associated with REP5 of virtual switch 112. That is, virtual function VF5 is logically connected via a $V_{ETH}$ to its associated representor REP5. Virtual switch 542 also includes a representor (REP6) that represents a virtual port for the communication of data between the virtual switch and network endpoint 544. Network endpoint 544 includes a virtual function (VF6) that represents a virtual port associated with REP5. That is, virtual function VF6 is logically connected via a $V_{ETH}$ to its associated representor REP6.

Figure 6:
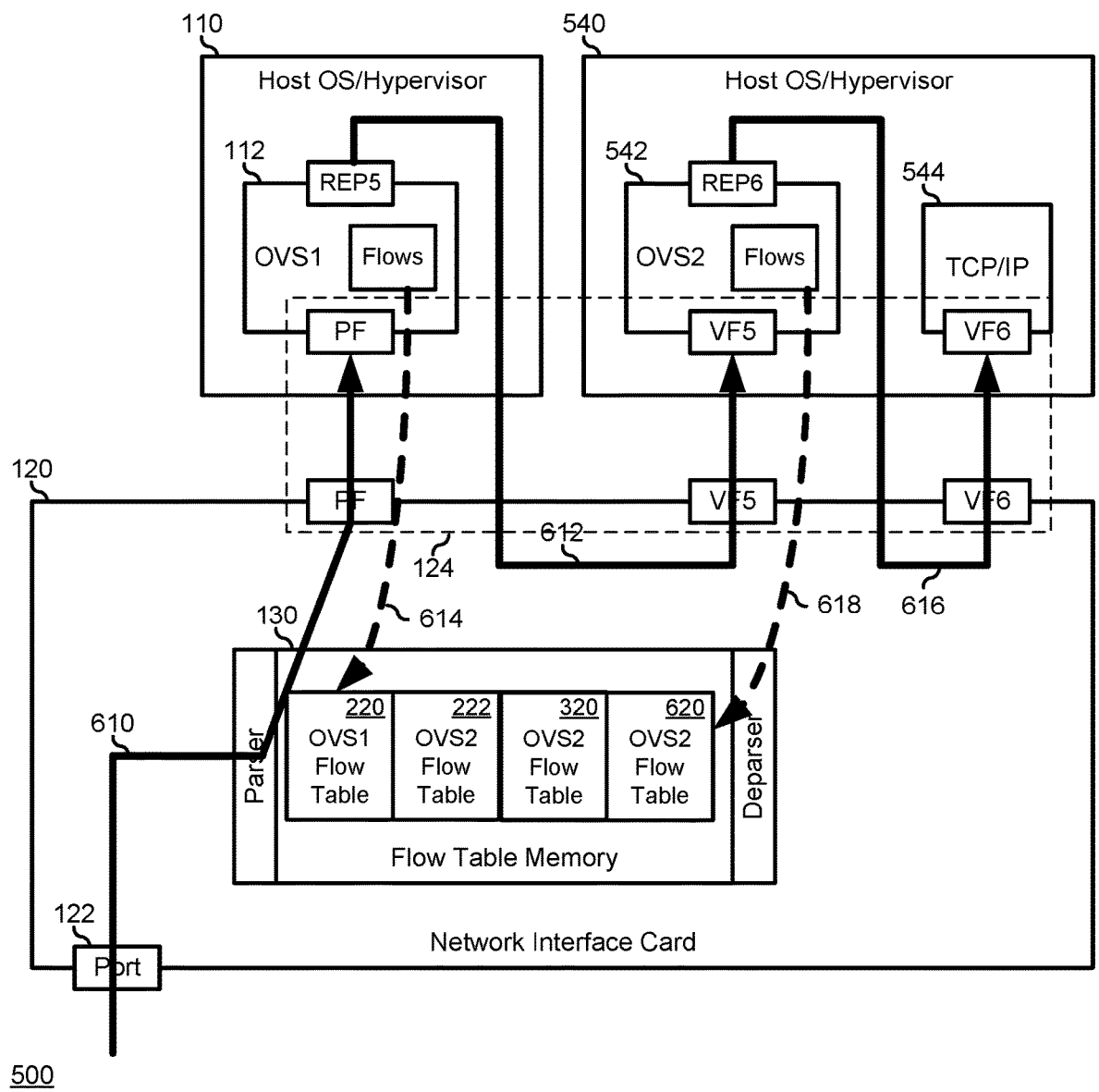
Figure 7:
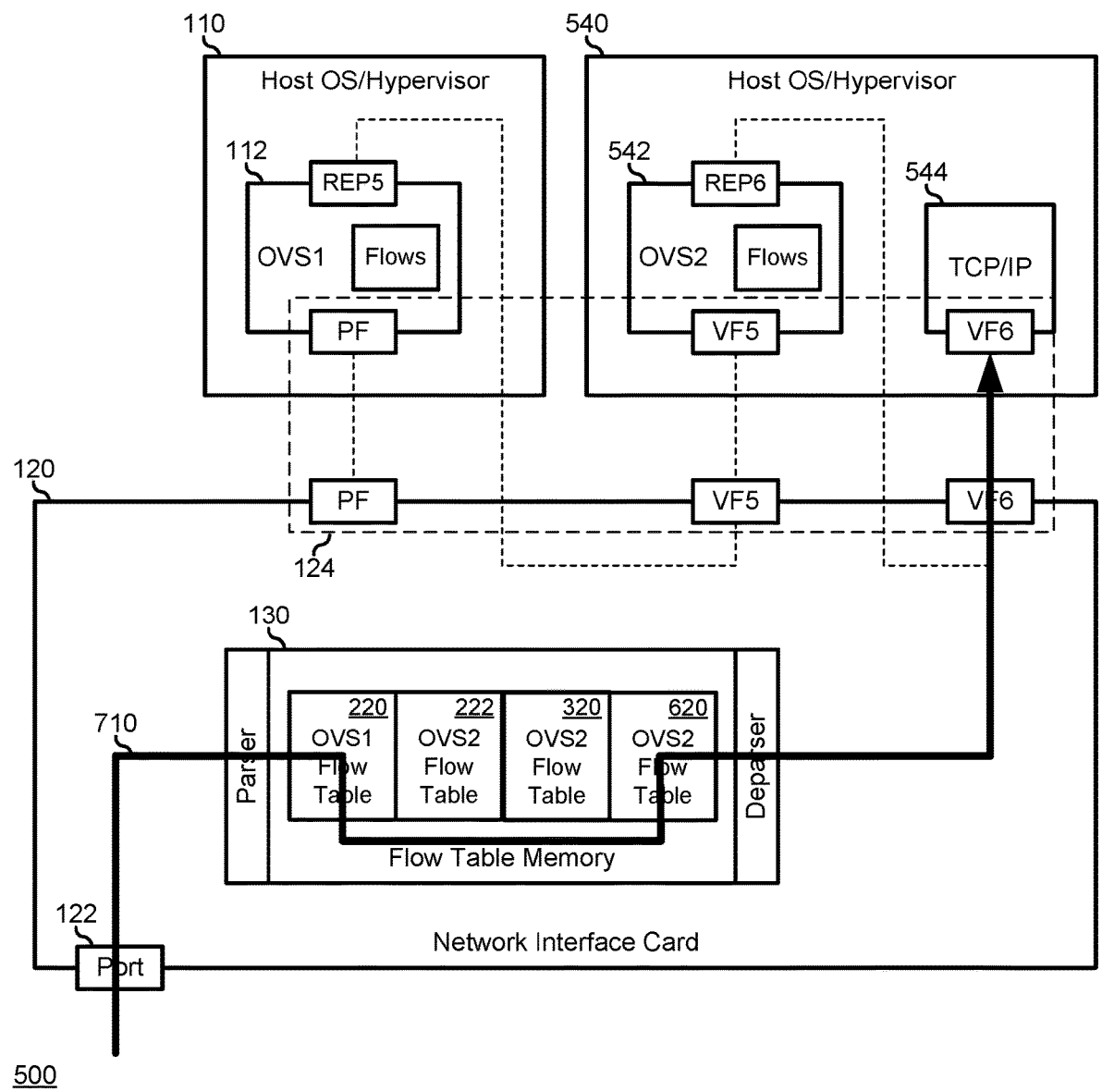

FIGS. 6 and 7 show the creation and use of a new fast path in NIC 120. In FIG. 6, a data packet 610 destined for an address associated with VM 540 is received at port 122, and is parsed by NIC 120. As NIC 120 has no flow routing rules for data packet 610, the NIC deparses the data packet and forwards it to PF via communication interface 124. When virtual switch 112 receives data packet 610, the virtual switch determines from its flow table that the data packet is destined for the address associated with VM 540 via REP5. Then, based upon the flow table, virtual switch 112 forwards the data packet 612 to REP5, and provides the flow table entries 614 for routing data packets destined to the address associated with VM 540 to NIC 120. NIC 120 populates flow table 220 with an entry for the address associated with VM 540 to be forwarded to REP5. Data packet 612, being from REP5, is understood by NIC 120 as being connected by a $V_{ETH}$ to VFS, and so NIC 120 forwards the data packet to VFS. Hence data packet 612 traverses communication interface 124 twice. When virtual switch 542 receives data packet 612, the virtual switch determines from its flow table that the data packet is destined for the address associated with VM 540 via REP6. Then, based upon the flow table, virtual switch 542 forwards the data packet 616 to REP6, and provides the flow table entries 618 for routing data packets destined to VM 540 to NIC 120. NIC 120 creates a flow table 620 associated with virtual switch 542 in flow table memory 130, and populates the flow table with an entry for the address associated with VM 540 to be forwarded to REP6. Data packet 616, being from REP5, is understood by NIC 120 as being connected by a $V_{ETH}$ to VF6, and so NIC 120 forwards the data packet to VF6. Hence data packet 616 traverses communication interface 124 twice, and the data packet, on its route from port 122 to VM 540 traverses the communication interface five (5) times. Finally, NIC 120 creates a fast path between flow table 220 and flow table 620 for flows associated with the address associated with VM 540, thereby permitting future data packets destined for addresses associated with VM 540 to flow directly from port 122 of VF6 (Port→VF6).

It will be understood that typically, a representor port (REP) sends data packets via the physical function (PF). In particular, a representor port (REP) will utilize the queues of the physical function (PF), and will not have its own PCI bus/device/function (BDF) in the PCI space of the information handling system. As such, a REP may not be able to be assigned within a VM because the VM instantiates its own PCI space. As such, in a particular embodiment, REP6 represents a novel type of port representor with the ability to change the physical port to which it is normally assigned, that is, the "virtual" physical function (PF) of VM 540, to the virtual port (VF5) through which data packets are received by the VM. Here, when OS 110 performs a pass through on VF5, VM 540 gains control of VF5 and REP6. Here further, OS 110 will do a pass through of VF6 to the VM 540, and the VM gains control of all three devices. Note, therefore, that in the previous case as shown in FIGS. 1-4, all of the representors (REP1, REP2, REP3, and REP4) are in a shared PCI address space as the physical function (PF), and so there is no need to change parent physical functions for the VM as described in the current embodiment. This may also be true in a container environment with namespaces because containers share one kernel and one PCI address space.

In a particular embodiment, the hardware offloading of nested virtual switches in an information handling system is performed by an Intelligent Server Adapter (ISA), or SmartNIC. Here, a SmartNIC is a network interface device with a native processing capability. For example, a NIC may include one or more processor core to implement server-based virtual network data plane functions, including multiple match-action processing, tunnel termination and origination, metering and shaping, and per-flow statistics. Here, all aspects of the creation and management of the virtual network, including control plane processing and data plane processing, is performed by the SmartNIC.

Figure 8:
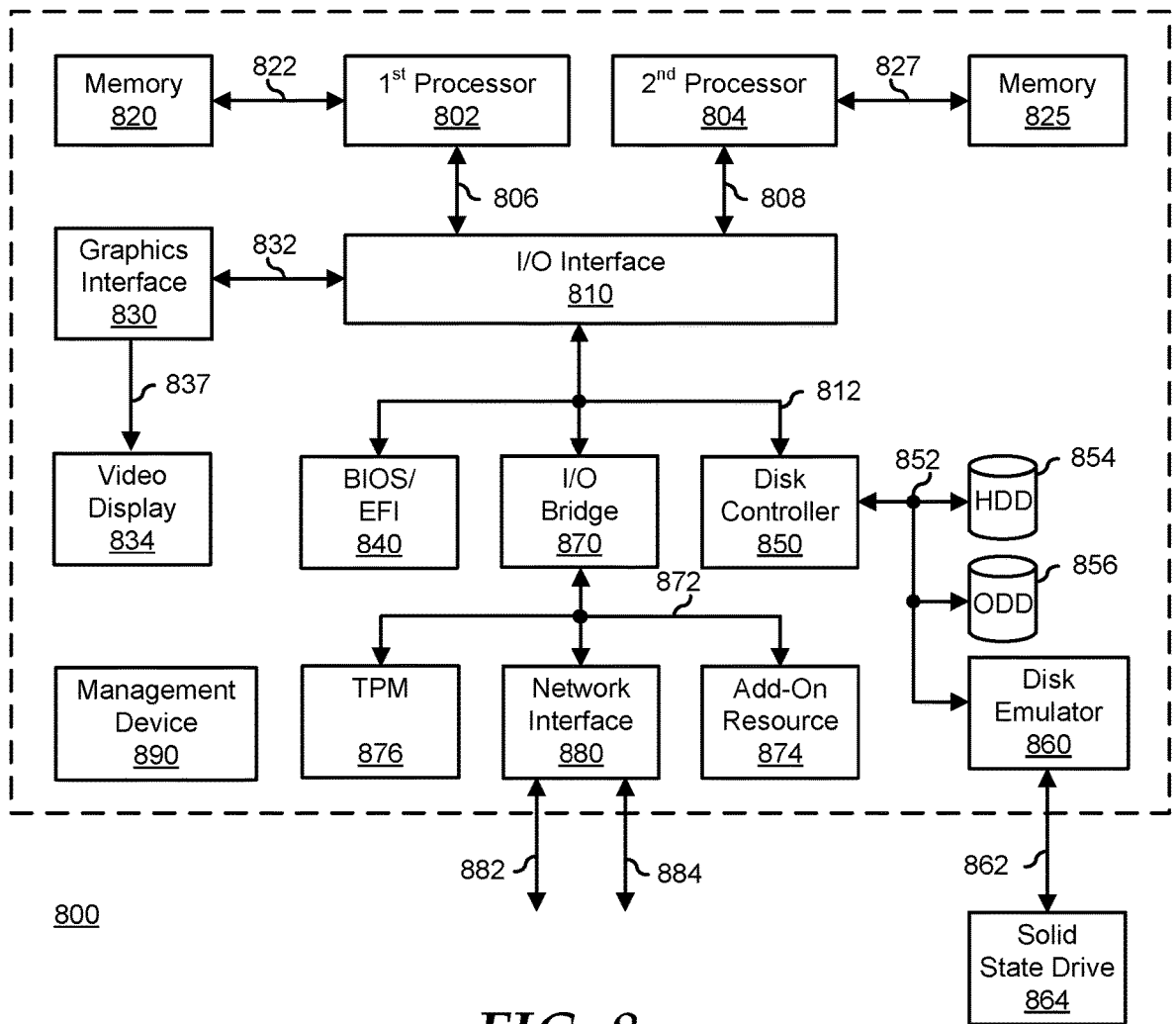
FIG. 8 is a block diagram illustrating a generalized information handling system according to another embodiment of the present disclosure.

FIG. 8 illustrates a generalized embodiment of an information handling system 800 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described below, and operates to perform one or more of the methods described below. Information handling system 800 includes a processors 802 and 804, an input/output (I/O) interface 810, memories 820 and 825, a graphics interface 830, a basic input and output system/universal extensible firmware interface (BIOS/UEFI) module 840, a disk controller 850, a hard disk drive (HDD) 854, an optical disk drive (ODD) 856, a disk emulator 860 connected to an external solid state drive (SSD) 864, an I/O bridge 870, one or more add-on resources 874, a trusted platform module (TPM) 876, a network interface 880, and a management device 890. Processors 802 and 804, I/O interface 810, memory 820, graphics interface 830, BIOS/UEFI module 840, disk controller 850, HDD 854, ODD 856, disk emulator 860, SSD 862, I/O bridge 870, add-on resources 874, TPM 876, and network interface 880 operate together to provide a host environment of information handling system 800 that operates to provide the data processing functionality of the information handling system. The host environment operates to execute machine-executable code, including platform BIOS/UEFI code, device firmware, operating system code, applications, programs, and the like, to perform the data processing tasks associated with information handling system 800.

In the host environment, processor 802 is connected to I/O interface 810 via processor interface 806, and processor 804 is connected to the I/O interface via processor interface 808. Memory 820 is connected to processor 802 via a memory interface 822. Memory 825 is connected to processor 804 via a memory interface 827. Graphics interface 830 is connected to I/O interface 810 via a graphics interface 832, and provides a video display output 837 to a video display 834. In a particular embodiment, information handling system 800 includes separate memories that are dedicated to each of processors 802 and 804 via separate memory interfaces. An example of memories 820 and 825 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 840, disk controller 850, and I/O bridge 870 are connected to I/O interface 810 via an I/O channel 812. An example of I/O channel 812 includes a Peripheral Component Interconnect (PCI) interface, a PCI-Extended (PCI-X) interface, a high speed PCI-Express (PCIe) interface, another industry standard or proprietary communication interface, or a combination thereof. I/O interface 810 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 840 includes BIOS/UEFI code operable to detect resources within information handling system 800, to provide drivers for the resources, initialize the resources, and access the resources. BIOS/UEFI module 840 includes code that operates to detect resources within information handling system 800, to provide drivers for the resources, to initialize the resources, and to access the resources.

Disk controller 850 includes a disk interface 852 that connects the disk controller to HDD 854, to ODD 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits SSD 864 to be connected to information handling system 800 via an external interface 862. An example of external interface 862 includes a USB interface, an IEEE 1394 (Firewire) interface, a proprietary interface, or a combination thereof. Alternatively, solid-state drive 864 can be disposed within information handling system 800.

I/O bridge 870 includes a peripheral interface 872 that connects the I/O bridge to add-on resource 874, to TPM 876, and to network interface 880. Peripheral interface 872 can be the same type of interface as I/O channel 812, or can be a different type of interface. As such, I/O bridge 870 extends the capacity of I/O channel 812 when peripheral interface 872 and the I/O channel are of the same type, and the I/O bridge translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as I/O interface 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management device 890 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 800. In particular, management device 890 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 800, such as system cooling fans and power supplies. Management device 890 can include a network connection to an external management system, and the management device can communicate with the management system to report status information for information handling system 800, to receive BIOS/UEFI or system firmware updates, or to perform other task for managing and controlling the operation of information handling system 800. Management device 890 can operate off of a separate power plane from the components of the host environment so that the management device receives power to manage information handling system 800 when the information handling system is otherwise shut down. An example of management device 890 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 890 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor; and
   a network interface card (NIC) coupled to the processor via a communication interface, and including a network communication port coupled to a network;
   wherein the processor is configured to instantiate a virtual network including at least two virtual switches and a virtual machine; and
   wherein the NIC is configured to:
      receive a first flow from a first virtual switch, the first flow directing data packets received on the network communication port and destined for the virtual machine to a second virtual switch;
      create a first flow table in response to receiving the first flow;
      store the first flow in the first flow table;
      receive a second flow from the second virtual switch, the second flow directing the data packets to the virtual machine;
      create a second flow table in response to receiving the second flow;
      store the second flow in the second flow table;
      receive a first data packet on the network communication port;
      determine that the first data packet is destined for the virtual machine; and
      route the first data packet to a virtual function associated with the virtual machine based on the first and second flows, without first routing the first data packet to either of the first or second virtual switches.

2. The information handling system of claim 1, wherein in routing the first data packet to the virtual function, the NIC is further configured to route the first data packet to the virtual machine.

3. The information handling system of claim 2, wherein in routing the first data packet to the virtual machine, the first data packet traverses the communication interface only one time.

4. The information handling system of claim 1, wherein the first and second virtual switches are Open Virtual Switches.

5. The information handling system of claim 1, wherein, prior to receiving the first data packet:
   the NIC is further configured to:
      receive a second data packet on the network communication port;
      determine that a destination for the second data packet is unknown to the NIC; and
      route the second data packet to the first virtual switch via the communication interface in response to determining that the destination is unknown; and
   the first virtual switch is configured to send the first flow to the NIC in response to receiving the second data packet.

6. The information handling system of claim 5, wherein:
   the first virtual switch is further configured to:
      route the second data packet to the second virtual switch via the NIC; and
   the second virtual switch is configured to send the second flow to the NIC in response to receiving the second data packet.

7. The information handling system of claim 6, wherein the NIC is further configured to:
   link the first flow to the second flow for data packets destined for the virtual machine.

8. The information handling system of claim 1, wherein the NIC includes a memory device, and the NIC is further configured to:
   store the first and second flows in the memory device.

9. A method, comprising:
   coupling a network interface card (MC) to a processor via a communication interface, wherein the NIC includes a network communication port coupled to a network;
   instantiating, by the processor, a virtual network including at least two virtual switches and a virtual machine;
   receiving, by the NIC, a first flow from a first virtual switch, the first flow directing data packets received on the network communication port and destined for the virtual machine to a second virtual switch;
   creating a first flow table in response to receiving the first flow;
   storing the first flow in the first flow table;
   receiving a second flow from the second virtual switch, the second flow directing the data packets to the virtual machine;
   creating a second flow table in response to receiving the second flow;
   storing the second flow in the second flow table;
   receiving a first data packet on the network communication port;
   determining that the first data packet is destined for the virtual machine; and
   routing, by the NIC, the first data packet to a virtual function associated with the virtual machine based on the first and second flows, without first routing the first data packet to either of the first or second virtual switches.

10. The method of claim 9, wherein in routing the first data packet to the virtual function, the method further comprises:
    routing, by the NIC, the first data packet to the virtual machine.

11. The method of claim 10, wherein in routing the first data packet to the virtual machine, the first data packet traverses the communication interface only one time.

12. The method of claim 9, wherein the first and second virtual switches are Open Virtual Switches.

13. The method of claim 9, wherein, prior to receiving the first data packet, the method further comprises:
receiving, by the NIC, a second data packet on the network communication port;
determining, by the NIC, that a destination for the second data packet is unknown to the NIC;
routing, by the NIC, the second data packet to the first virtual switch via the communication interface in response to determining that the destination is unknown; and
configuring the first virtual switch to send the first flow to the NIC in response to receiving the second data packet.

14. The method of claim 13, further comprising:
routing, by the first virtual switch, the second data packet to the second virtual switch via the NIC; and
sending, by the second virtual switch, the second flow to the NIC in response to receiving the second data packet.

15. The method of claim 14, further comprising:
linking, by the NIC, the first flow to the second flow for data packets destined for the virtual machine.

16. The method of claim 9, wherein the NIC includes a memory device, and the method further comprises:
storing, by the NIC, the first and second flows in the memory device.

17. A network interface card (NIC), comprising:
a memory device;
a communication interface coupled to a processor; and
a network communication port coupled to a network;
wherein the NIC is configured to:
receive a first flow from a first virtual switch of a virtual network instantiated by the processor, the first flow directing data packets received on the network communication port and destined for the virtual machine to a second virtual switch of the virtual network;
create a first flow table in the memory in response to receiving the first flow;
store the first flow in the first flow table;
receive a second flow from the second virtual switch, the second flow directing the data packets to a virtual machine instantiated by the processor;
create a second flow table in the memory in response to receiving the second flow;
store the second flow in the second flow table;
link the first flow to the second flow for data packets destined for the virtual machine;
receive a first data packet on the network communication port;
determine that the first data packet is destined for the virtual machine; and
route the first data packet to a virtual function associated with the virtual machine based on the first and second flows, without first routing the first data packet to either of the first or second virtual switches.

18. The NIC of claim 17, wherein in routing the first data packet to the virtual function, the NIC is further configured to route the first data packet to the virtual machine, wherein in routing the first data packet to the virtual machine, the first data packet traverses the communication interface only one time.

* * * * *

UNITED STATES PATENT AND TRADEMARK OFFICE
CERTIFICATE OF CORRECTION

PATENT NO. : 11,740,919 B2
APPLICATION NO. : 16/876703
DATED : August 29, 2023
INVENTOR(S) : Lee Ballard et al.

It is certified that error appears in the above-identified patent and that said Letters Patent is hereby corrected as shown below:

In the Claims

Column 12, Line 33: Claim 9 change "(MC)" to --(NIC)--

Signed and Sealed this
Second Day of April, 2024

Katherine Kelly Vidal
*Director of the United States Patent and Trademark Office*